United States Patent
Itou et al.

(10) Patent No.: US 9,957,373 B2
(45) Date of Patent: May 1, 2018

(54) PROCESS FOR CROSSLINKING AN ETHYLENE-BASED POLYMER

(71) Applicant: Akzo Nobel Chemicals International B.V., Arnhem (NL)

(72) Inventors: Tadanaga Itou, Tokyo (JP); Koichi Tateishi, Yamaguchi (JP)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days. days.

(21) Appl. No.: 14/917,086

(22) PCT Filed: Sep. 8, 2014

(86) PCT No.: PCT/EP2014/069023
§ 371 (c)(1),
(2) Date: Mar. 7, 2016

(87) PCT Pub. No.: WO2015/036341
PCT Pub. Date: Mar. 19, 2015

(65) Prior Publication Data
US 2016/0215118 A1    Jul. 28, 2016

(30) Foreign Application Priority Data
Sep. 11, 2013   (EP) .................... 13183928

(51) Int. Cl.
*C08J 3/24*         (2006.01)
*C08K 5/14*         (2006.01)

(52) U.S. Cl.
CPC ............. *C08K 5/14* (2013.01); *C08J 3/248* (2013.01); *C08J 3/24* (2013.01); *C08J 2323/08* (2013.01); *C08J 2331/04* (2013.01)

(58) Field of Classification Search
CPC . C08K 5/14; C08J 3/24; C08J 2323/08; C08J 2331/04
USPC ............................. 525/330.3, 387
See application file for complete search history.

(56) References Cited

U.S. PATENT DOCUMENTS

| | | | |
|---|---|---|---|
| 2,200,429 A * | 5/1940 | Paton | C08F 210/02 526/235 |
| 3,236,872 A | 2/1966 | Manly et al. | |
| 3,846,396 A | 11/1974 | D'Angelo et al. | |
| 3,928,525 A * | 12/1975 | Fuwa | B29C 47/0004 264/171.17 |
| 5,660,645 A * | 8/1997 | Mori | B32B 17/10678 136/251 |
| 2003/0225229 A1 * | 12/2003 | Van Swieten | C08F 20/12 526/227 |
| 2010/0229945 A1 * | 9/2010 | Suzuta | B32B 7/12 136/259 |
| 2012/0301991 A1 | 11/2012 | Devisme et al. | |

FOREIGN PATENT DOCUMENTS

| | | |
|---|---|---|
| EP | 2680318 A1 | 1/2014 |
| GB | 899796 * | 6/1962 |
| WO | 00/08072 A1 | 2/2000 |
| WO | 2012/114861 A1 | 8/2012 |

OTHER PUBLICATIONS

European Search Report fror EP 13183928.4, dated Jan. 28, 2014.
International Search Report and Written Opinion for PCT/EP2014/069023, dated Nov. 14, 2014.
Database WPI, Week 201258, Thomson Scientific, London, GV; AN 2012-L37241, EP002731969 & WO 2012/114861 A1 (Bridgestone Corp), Aug. 30, 2012, abstract—& EP 2680318 A1 (Bridgestone Corp [JP]), Jan. 1, 2014, examples.

* cited by examiner

*Primary Examiner* — Roberto Rabago
(74) *Attorney, Agent, or Firm* — McDonnell Boehnen Hulbert & Berghoff LLP

(57) ABSTRACT

A method for crosslinking a copolymer of ethylene and at least one other monomer using an organic peroxide represented by Formula (1): wherein R1 is either a methyl or an ethyl group and wherein (i) R1 is a methyl group, R2 is an alkyl group having 1 to 8 carbon atoms optionally substituted with groups containing O, Si, P, S, SO— or $SO_2$ functionalities; (ii) if R1 is an ethyl group, R2 is an alkyl group having 2 to 8 carbon atoms optionally substituted with groups containing O, Si, P, S, SO— or $SO_2$ functionalities.

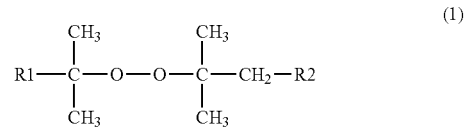

(1)

3 Claims, No Drawings

PROCESS FOR CROSSLINKING AN ETHYLENE-BASED POLYMER

This application is a national stage filing under 35 U.S.C. § 371 of PCT/EP2014/069023, filed Sep. 8, 2014, which claims priority to European Patent Application No. 13183928.4, filed Sep. 11, 2013, the contents of each of which are incorporated herein by reference to the extent not inconsistent with the present disclosure.

The invention relates to a method for crosslinking a copolymer of ethylene and at least one other monomer.

An example of such a copolymer is an ethylene-vinyl acetate copolymer (hereinafter abbreviated as EVA). EVA resin has a favorable level of transparency, flexibility, rubber elasticity, low-temperature properties, and adhesive properties, and is used in a variety of applications such as solar cell module sealing materials, laminated glass interlayer films, agricultural films, and stretch films. Particularly these days, there is a sharply increasing demand for EVA resin to form sealing materials for solar cell modules which attract attention as clean energy sources.

Organic peroxides are widely used as agents for crosslinking (also called: curing) a variety of rubbers and plastics. In order for EVA resin sealing materials to have higher heat resistance, durability, or other physical properties, EVA resin is conventionally crosslinked using an organic peroxide as a crosslinking agent. In this process, the organic peroxide is decomposed by heat to form chemical species with which EVA resin is crosslinked.

A solar cell module usually includes solar cells that are sealed with sheet-shaped EVA sealing materials between a front-side transparent protective sheet (such as a glass sheet) and a back-side protective sheet (such as fluororesin or polyethylene terephthalate resin). Such a solar cell module is produced by a process including stacking a glass sheet, an EVA sealing sheet, cells, an EVA sealing sheet, and a back-side protective sheet and heat-pressing them to crosslink EVA resin for bonding and sealing.

Currently, there is a sharply increasing worldwide demand for solar cell modules. As a result, module manufacturers want to increase the speed of the solar cell module-manufacturing cycle process. However, the process of heat sealing with EVA resin sheets takes a relatively long time, which is a barrier to increasing the speed of the cycle process and raises a big problem with productivity.

Various techniques have been proposed for reducing the time required to perform the process of heat sealing with EVA resin sheets in the manufacture of a solar cell module. One such technique uses an organic peroxide with a low half-life temperature as a crosslinking agent so that it can be easily decomposed to enable EVA resin to be crosslinked in a shorter period of time.

Crosslinking agents generally used for crosslinking EVA resins include bifunctional organic peroxides having two peroxide bonds (—O—O—) per molecule, such as 2,5-dimethyl-2,5-di(tert-butylperoxy)hexane, which is a dialkyl peroxide; and organic peroxides having an even lower decomposition temperature, such as organic peroxides having a peroxyketal structure or a peroxycarbonate structure. WO 2012/114761 (also published as EP 2 680 318 A1), for instance, discloses a solar cell sealing film comprising EVA and 2,5-dimethyl-2,5-di(tert-butylperoxy)hexane as crosslinking agent.

Unfortunately, 2,5-dimethyl-2,5-di(tert-butylperoxy) hexane has a one-minute half-life temperature around 180° C. This means that, as the amount of it added to resin increases, the amount of its unreacted residue increases, so that a longer time is required to decompose a predetermined amount of it, which makes it difficult to reduce the time required for crosslinking. A monofunctional dialkyl peroxide (thus: having one peroxide bond (—O—O—) per molecule) has a low one-minute half-life temperature when the two alkyl groups each have 6 or more carbon atoms, and the time required for crosslinking can be reduced using such an organic peroxide.

However, such an organic peroxide has a problem in that it cannot provide a high degree of crosslinking (a high gel fraction). In addition, peroxides with a peroxyketal structure or a peroxycarbonate structure have a potential problem in that their decomposition leads to a large amount of gas, which can form a large number of voids in a crosslinked EVA product, thereby degrading the appearance and the performance. Thus, there is a problem in that an increase in crosslinking rate and production of a crosslinked resin product having less voids cannot be achieved by selecting conventional organic peroxides as crosslinking agents, nor by using a combination of different conventional organic peroxides.

It is an object of the invention to provide a method for crosslinking a copolymer of ethylene and any other monomer at a higher crosslinking rate. Another object is to produce a crosslinked resin product containing less voids.

These objects are achieved by the use of an organic peroxide with a structure according to Formula (1) below.

The present invention therefore relates to a method for crosslinking a copolymer of ethylene and at least one other monomer using an organic peroxide represented by Formula (1):

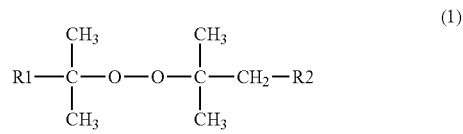

wherein R1 is either a methyl or an ethyl group and wherein
if R1 is a methyl group, R2 is an alkyl group having 1 to 8 carbon atoms optionally substituted with groups containing O, Si, P, S, SO— or $SO_2$ functionalities;
if R1 is an ethyl group, R2 is an alkyl group having 2 to 8 carbon atoms optionally substituted with groups containing O, Si, P, S, SO— or $SO_2$ functionalities.

In a preferred embodiment, if R1 is a methyl group, R2 is an alkyl group having 1 to 8 carbon atoms and if R1 is an ethyl group, R2 is an alkyl group having 2 to 8 carbon atoms.

The preferred ethylene copolymer to be crosslinked according to this process is ethylene-vinyl acetate copolymer (EVA).

When the organic peroxide according to the invention is used as a crosslinking agent, a copolymer of ethylene and another monomer can be crosslinked in a short period of time, and a crosslinked resin product having less voids and a good performance and appearance can be obtained.

Crosslinking of ethylene copolymers, such as EVA, differs from crosslinking of ethylene homopolymers in that the crosslinking of ethylene copolymers is performed at lower temperatures than crosslinking of ethylene homopolymers. As a consequence, ethylene homopolymer crosslinking requires the use of high temperature stable peroxides, which generally underperform at the lower temperatures required for ethylene copolymer crosslinking.

Examples of organic peroxides according to Formula (1) include tert-butyl-1,1-dimethylpropyl peroxide, tert-butyl-1,1-dimethylbutyl peroxide, tert-butyl-1,1,3,3-tetramethylbutyl peroxide, 1,1-dimethylpropyl-1,1-dimethylbutyl peroxide, 1,1-dimethylpropyl tert-1,1,3,3-tetramethylbutyl peroxide, and combinations thereof.

The organic peroxide according to Formula (1) may be used in combination with organic peroxides having another structure, such as dialkyl peroxides with a structure different from Formula (1), peroxycarbonates, alkyl peresters, peroxyketals, diacyl peroxides, ketone peroxides, and hydroperoxides.

In the invention, any suitable crosslinking method may be used. A suitable method is crosslinking by heat pressing with a laminator.

The crosslinking temperature is preferably in the range from 80 to 300° C., more preferably from 120 to 180° C., and most preferably from 120 to 160° C.

The amount of organic peroxide that can be added depends on the desired physical properties of the intended crosslinked copolymer. The organic peroxide of Formula (1) is preferably added in an amount of 0.05 parts by weight or more, more preferably 0.1 parts by weight or more, and preferably in an amount of 5.0 parts by weight or less, more preferably 2.0 parts by weight or less, based on 100 parts by weight of ethylene copolymer and calculated as pure peroxide. If the organic peroxide is added in a too small amount, the crosslinked product can fail to have the desired physical properties. If the added amount is too large, the organic peroxide or its decomposition product can remain as a residue in the crosslinked product to cause swelling of the crosslinked product or the formation of voids.

The organic peroxide may be added to the copolymer in pure form or as a diluted composition. The peroxide may be diluted with one or more solid or liquid diluents.

In the crosslinking method according to the invention, if necessary, an additive other than the organic peroxide may be present. Examples of such additives are crosslinking aids (such as triallyl cyanurate, triallyl isocyanurate, trimethylolpropane trimethacrylate, or ethylene glycol dimethacrylate), co-agents (such as divinyl benzene, bismaleimides, and biscitraconimides), anti-scorching agents, vulcanization accelerators, absorbents, anti-oxidants, ultraviolet stabilizers, anti-static agents, coupling agents, surfactants, plasticizers, and process oils. These additives may be added to the copolymer together with or separately from the organic peroxide.

The organic peroxide and the optional additive may be uniformly mixed with the copolymer by conventional methods, using a mixer, a kneader, a roller, or the like.

The resulting mixture containing the organic peroxide and the copolymer may be crosslinked by a conventional method such as crosslinking by heat pressing.

EXAMPLE 1

The organic peroxide used was tert-butyl-1,1,3,3-tetramethylbutyl peroxide (abbreviation: BOP). In each case, 1.1 parts by weight of BOP were added to 100 parts by weight of EVA resin (vinyl acetate content: 32 parts by weight), and uniformly dispersed using two rolls at 65° C. The crosslink characteristics of the resulting EVA resin compound were measured at 160° C. using a curelastometer (JSR Model III). T10 represents the time until the torque reaches 10% of the maximum torque, and T90 represents the time until the torque reaches 90% of the maximum torque. T90-T10 is used as a measure of crosslinking rate. The crosslink characteristics in the process of sealing a solar battery can be estimated from these values. Table 1 shows the results of the test.

Examination of the Occurrence of Voids

BOP (1.1 parts by weight) was added to 100 parts by weight of EVA resin (vinyl acetate content: 32 parts by weight) and uniformly dispersed using two rolls at 60° C. The resulting EVA resin compound was placed in a press machine at 90° C. and allowed to stand for 3 minutes. The compound was held under a pressure of 5 kg/cm$^2$, 10 kg/cm$^2$, 20 kg/cm$^2$, 30 kg/cm$^2$, 40 kg/cm$^2$, or 50 kg/cm$^2$ for 2 minutes to form a sheet (9.5 cm long×7.5 cm wide).

Each sheet was crosslinked under the conditions of 150° C., 40 minutes, and a load of 21 g/cm$^2$. The amount of voids formed in the sheet was visually determined. Discoloration of the EVA resin, which is particularly important for solar battery applications, was also visually evaluated. Table 1 shows the results of the test.

Measurement of Gel Fraction

Gel fraction can be used as a measure of crosslinking. A higher gel fraction indicates better crosslink characteristics. The gel fraction was determined by refluxing 0.5 g of the crosslinked EVA resin in xylene for 16 hours. The insoluble fraction was collected by filtration, dried, and then weighed. The gel fraction is the weight of the dried residue divided by the initial weight of the resin. Table 1 shows the results of the test.

EXAMPLE 2

Example 1 was repeated, except that 1.2 parts by weight of 1,1-dimethylpropyl 1,1,3,3-tetramethylbutyl peroxide (abbreviation: POP) were used instead of the organic peroxide (BOP) used in Example 1 and that the occurrence of voids was not observed. Table 1 shows the results of the test.

COMPARATIVE EXAMPLE 1

Example 1 was repeated, except that 0.8 parts by weight of 2,5-dimethyl-2,5-di(tert-butylperoxy)hexane (abbreviation: DMDTB) was used instead of the organic peroxide (BOP) used in Example 1. Table 1 shows the results of the test.

COMPARATIVE EXAMPLE 2

Example 1 was repeated, except that 1.4 parts by weight of di(1,1,3,3-tetramethylbutyl) peroxide (abbreviation: DOP) was used instead of the organic peroxide (BOP) used in Example 1 and that the crosslinking time was set at 30 minutes in the examination of the occurrence of voids. Table 1 shows the results of the test.

TABLE 1

|  | Example 1 | Example 2 | Comparative Example 1 | Comparative Example 2 |
|---|---|---|---|---|
| Components (parts by weight)* | | | | |
| EVA resin | 100 | 100 | 100 | 100 |
| BOP | 1.1 | — | — | — |
| POP | — | 1.2 | — | — |
| DMDTB | — | — | 0.8 | — |
| DOP | — | — | — | 1.4 |

TABLE 1-continued

|  | Example 1 | Example 2 | Comparative Example 1 | Comparative Example 2 |
|---|---|---|---|---|
| Crosslink characteristics | | | | |
| Crosslinking temperature [° C.] | 160 | 160 | 160 | 160 |
| T10 [seconds] | 69 | 48 | 105 | 42 |
| T90 [seconds] | 945 | 421 | 2006 | 246 |
| T90 − T10 [seconds] | 876 | 373 | 1901 | 204 |
| Crosslinking rate | ○ | ◇ | x | ◇ |
| Gel fraction [%] | 93 | 86 | 94 | 77 |
| Degree of crosslinking | ◇ | ○ | ◇ | x |
| Number of voids [/10 cm2] | 41 | — | 43 | 127 |
| Voids | ◇ | — | ◇ | x |
| Discoloration | ◇ | ◇ | ◇ | ◇ |

*The crosslinking agent was added in such an amount that the same number of peroxide bonds (—O—O—) were provided.

Crosslinking rate
◇: T90 − T10 is 400 seconds or less (considerably high rate).
○: T90 − T10 is more than 400 seconds to 1,000 seconds (high rate).
Δ: T90 − T10 is more than 1,000 seconds to 1,600 seconds (slightly low rate).
x: T90 − T10 is more than 1,600 seconds (low rate).

Voids
◇: The number [/10 cm²] of voids is 60 or less (considerably small number).
○: The number [/10 cm²] of voids is more than 60 to 80 (small number).
Δ: The number [/10 cm²] of voids is more than 80 to 100 (slightly large number).
x: The number [/10 cm²] of voids is more than 100 (large number).

Degree of crosslinking
◇: The gel fraction is 90% or more (considerably high degree).
○: The gel fraction is 85% or more (high degree).
Δ: The gel fraction is 80% or more (slightly low degree).
x: The gel fraction is 80% or less (low degree).

Discoloration
◇: Discoloration is not observed at all.
○: Discoloration is slightly observed.
Δ: Discoloration is clearly observed.
x: Considerably significant discoloration is observed.

The results show that when an organic peroxide having the structure according to the invention is used as a crosslinking agent, it takes only a very short period of time to crosslink EVA resin, and a crosslinked product having less voids and a good appearance can be obtained.

The invention claimed is:

1. A method for crosslinking a copolymer of ethylene and at least one other monomer, the method comprising heating the copolymer at 80-300° C. in the presence of an organic peroxide, wherein the organic peroxide is tert-butyl-1,1-dimethylbutyl peroxide, tert-butyl-1,1,3,3-tetramethylbutyl peroxide, 1,1-dimethylpropyl tert-1,1,3,3-tetramethylbutyl peroxide, and combinations thereof.

2. The method according to claim 1, wherein the copolymer of ethylene and at least one other monomer is an ethylene-vinyl acetate copolymer.

3. The method according to claim 1 wherein the organic peroxide is tert-butyl-1,1,3,3-tetramethylbutyl peroxide or 1,1-dimethylpropyl tert-1,1,3,3-tetramethylbutyl peroxide.

* * * * *